United States Patent
Maloney et al.

(10) Patent No.: US 10,894,488 B2
(45) Date of Patent: Jan. 19, 2021

(54) SEAT ADJUSTMENT ASSEMBLY

(71) Applicant: Ford Global Technologies, LLC, Dearborn, MI (US)

(72) Inventors: Patrick Maloney, Livonia, MI (US); John Wayne Jaranson, Dearborn, MI (US); Christian J. Hosbach, Taylor, MI (US); Johnathan Andrew Line, Northville, MI (US); Vishal Vinayak Nageshkar, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 16/420,694

(22) Filed: May 23, 2019

(65) Prior Publication Data
US 2020/0369178 A1 Nov. 26, 2020

(51) Int. Cl.
*B60N 2/02* (2006.01)
*B60N 2/06* (2006.01)

(52) U.S. Cl.
CPC ........... *B60N 2/0232* (2013.01); *B60N 2/067* (2013.01); *B60N 2002/0236* (2013.01)

(58) Field of Classification Search
None
See application file for complete search history.

(56) References Cited

U.S. PATENT DOCUMENTS

| 4,284,935 A | 8/1981 | March et al. |
| 5,570,931 A * | 11/1996 | Kargilis ................. B60N 2/206 248/429 |
| 2003/0222613 A1 | 12/2003 | Babcock et al. |
| 2007/0158969 A1 * | 7/2007 | Walkingshaw ...... B60N 2/0737 296/64 |

FOREIGN PATENT DOCUMENTS

| JP | H08156658 A | 6/1996 |
| JP | 2005132241 A | 5/2005 |
| JP | 201076553 A | 4/2010 |
| JP | 2015116833 A | 6/2015 |
| KR | 20100033583 A | 3/2010 |
| WO | 1999005000 A1 | 2/1999 |

* cited by examiner

*Primary Examiner* — Lori L Lyjak
(74) *Attorney, Agent, or Firm* — David Coppiellie; Price Heneveld LLP

(57) ABSTRACT

A vehicle seating assembly includes a seat base. A floor track assembly includes a floor track having a roller track and a rack. At least one pinion gear is configured to rotate along the rack. At least one floor track motor is disposed adjacent to the floor track assembly. The at least one floor track motor rotates the at least one pinion gear along the rack to laterally translate the seat base fore and aft. An elevated track assembly is operably coupled to the floor track assembly. The seat base is coupled to the elevated track assembly. The elevated track assembly is laterally translatable relative to the floor track assembly.

20 Claims, 8 Drawing Sheets

SEAT ADJUSTMENT ASSEMBLY

FIELD OF THE DISCLOSURE

The present disclosure generally relates to a seat adjustment assembly, and more specifically, to a seat adjustment assembly for a vehicle.

BACKGROUND OF THE DISCLOSURE

Vehicles often include seats that translate forward and backward within the vehicle. The seats are often adjustable to provide more leg room for a passenger. Additionally, vehicles may also include seating adjustments that allow seats to move between a vehicle-forward position and a vehicle-rearward position.

SUMMARY OF THE DISCLOSURE

According to one aspect of the present disclosure, a vehicle seating assembly includes a seat base. A floor track assembly includes a floor track having a roller track and a rack. At least one pinion gear is configured to rotate along the rack. At least one floor track motor is disposed adjacent to the floor track assembly. The at least one floor track motor rotates the at least one pinion gear along the rack to laterally translate the seat base fore and aft. An elevated track assembly is operably coupled to the floor track assembly. The seat base is coupled to the elevated track assembly. The elevated track assembly is laterally translatable relative to the floor track assembly. Embodiments of the first aspect of the disclosure can include any one or a combination of the following features:

- the at least one floor track motor includes a first floor track motor and a second floor track motor, and wherein the first and second floor track motors are coupled by a cross member;
- the at least one pinion gear includes a first pinion gear and a second pinion gear, and wherein the cross member extends through the first and second floor track motors to couple with the first and second pinion gears;
- the elevated track assembly includes an elevated track for laterally translating the seat base relative to the floor track assembly;
- an elevated track motor is disposed adjacent to the elevated track assembly;
- the floor track assembly includes a roller assembly operably coupled to the roller track, and wherein the elevated track assembly is coupled to the roller assembly for translating the elevated track assembly relative to the floor track assembly; and
- the seat base is translated along the rack at a rate in a range of from about 0.5 inches per second to about 3 inches per second.

According to another aspect of the present disclosure, a seating assembly includes a floor track assembly with a floor track for laterally translating a seat base between fore and aft positions. A first floor track motor is disposed adjacent to the floor track assembly. A second floor track motor is disposed adjacent to the floor track assembly and is operably coupled to the first floor track motor. The first and second floor track motors laterally translate the seat base along the floor track assembly. An elevated track assembly includes an elevated track for laterally translating the seat base relative to the floor track assembly. The elevated track assembly is operably coupled to the floor track assembly. Embodiments of the second aspect of the disclosure can include any one or a combination of the following features:

- the floor track includes a roller track and a rack;
- the floor track assembly includes a roller assembly engaging the roller track, and wherein the elevated track is coupled to the roller assembly;
- first and second pinion gears are operably coupled to the first and second floor track motors;
- the floor track assembly includes a first rack and a second rack, and wherein the first and second floor track motors rotate the first and second pinion gears along the first and second racks, respectively, to translate the seat base between the fore and aft positions;
- the elevated track assembly is laterally translatable relative to the floor track assembly;
- an elevated track motor assembly includes an elevated track motor for translating the seat base fore and aft relative to the floor track assembly; and
- operation speeds of the first and second floor track motors are adjustable via pulse width modulation controls.

According to another aspect of the present disclosure, a seat adjustment assembly includes a floor track assembly with a floor track having a rack. A floor track motor assembly includes at least one floor track motor and a pinion gear. The at least one floor track motor rotates the pinion gear along the rack. An elevated track assembly is operably coupled to the floor track assembly. An elevated track motor assembly includes an elevated track motor for laterally translating a seat base fore and aft relative to the floor track assembly. Embodiments of the third aspect of the disclosure can include any one or a combination of the following features:

- the floor track includes a roller track disposed adjacent to the rack;
- the elevated track assembly includes a elevated track for laterally translating a seat base relative to the floor track assembly;
- the floor track assembly includes a cross member, and further wherein the at least one floor track motor includes a first floor track motor and a second floor track motor coupled via the cross member; and
- the elevated track assembly is laterally translatable relative to the floor track assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the disclosure will be set forth in the detailed description which follows and will be apparent to those skilled in the art from the description, or recognized by practicing the disclosure as described in the following description, together with the claims and appended drawings.

Figure 1:
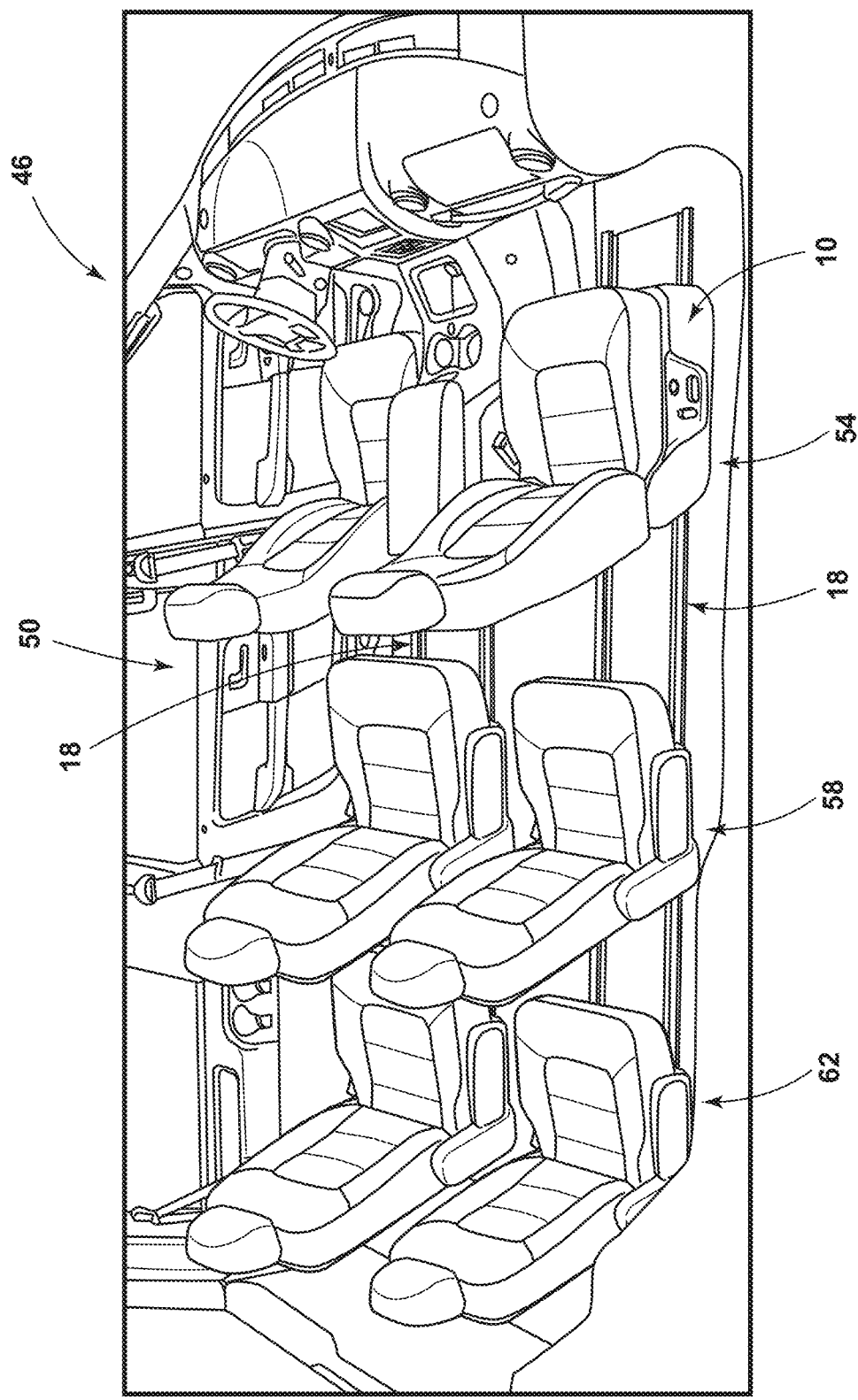
FIG. 1 is a side perspective view of a passenger cabin of a vehicle having seating assemblies, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring to FIGS. 1-8, reference numeral 10 generally refers to a vehicle seating assembly including a seat base 14. A floor track assembly 18 includes a floor track 22 having a roller track 26 and a rack 30. At least one pinion gear 34 is configured to rotate along the rack 30. At least one floor track motor 38 is disposed adjacent to the floor track assembly 18 and rotates the at least one pinion gear 34 along the rack 30 to laterally translate the seat base 14 fore and aft. An elevated track assembly 42 is operably coupled to the floor track assembly 18. The seat base 14 is coupled to the elevated track assembly 42. The elevated track assembly 42 is laterally translatable relative to the floor track assembly 18.

Referring to FIG. 1, a vehicle 46 includes a passenger cabin 50 having multiple seating assemblies 10. The seating assemblies 10 may be arranged in at least one of a first seating row 54, a second seating row 58, and a third seating row 62. The first seating row 54 is disposed in a vehicle-forward portion of the vehicle 46, the third seating row 62 is disposed in a vehicle-rearward portion of the vehicle 46, and the second seating row 58 is disposed therebetween. It is also contemplated that the seating assemblies 10 may be disposed between the defined seating rows (e.g. the first, second, and third seating rows 54, 58, 62) without departing from the teaching herein. The vehicle 46 may be a sedan, sports utility vehicle, a van, a truck, a crossover, or other style vehicles 46. The vehicle 46 may be a manually operated vehicle 46 (e.g., with a human driver), a fully autonomous vehicle 46 (e.g., no human driver), or a partially autonomous vehicle 46 (e.g., may be operated with or without a human driver). Additionally, the vehicle 46 may be utilized for personal and/or commercial purposes, such as for ride-providing services (e.g., chauffeuring) and/or ride-sharing services.

Figure 2:
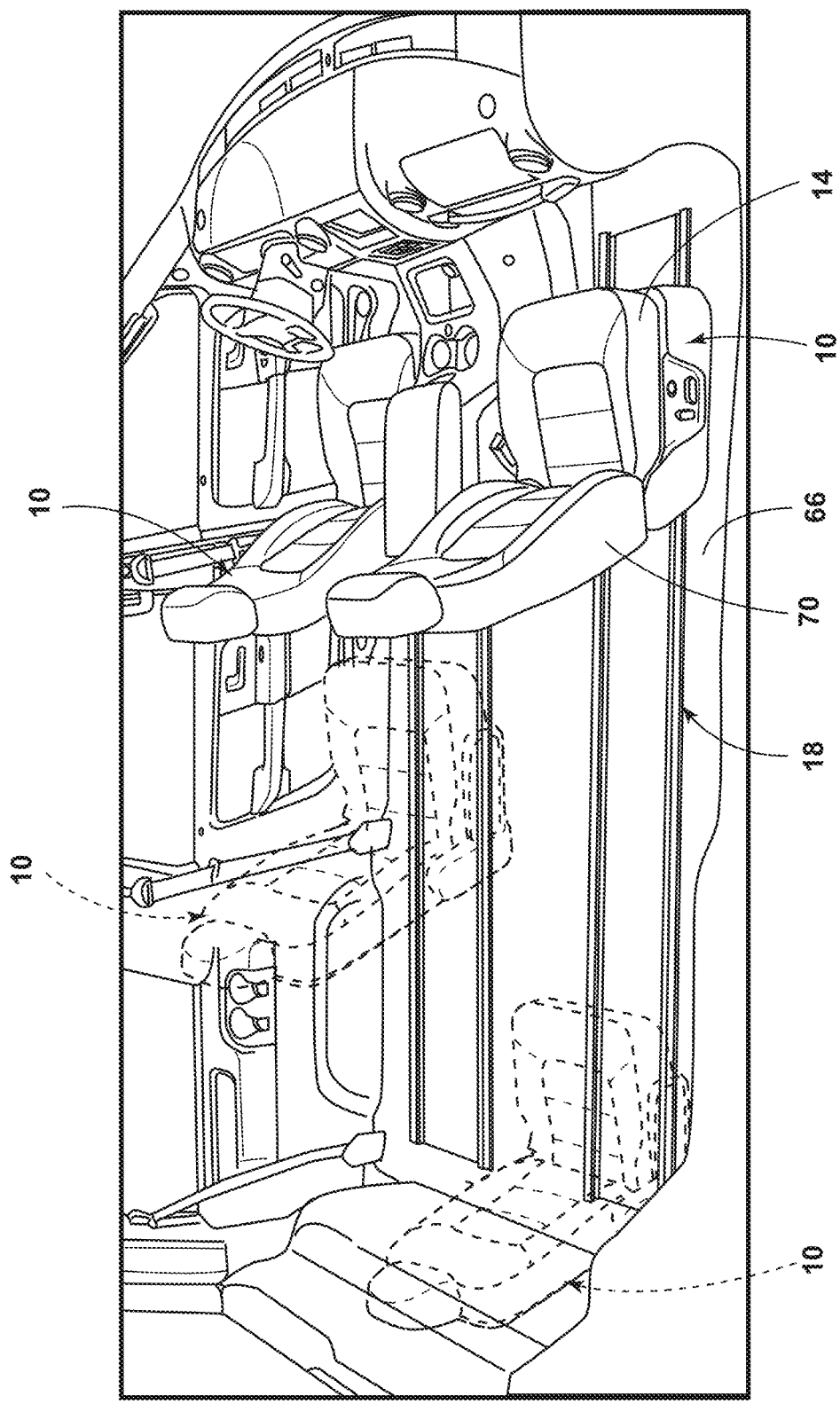
FIG. 2 is a side perspective view of seating assemblies translated between fore and aft positions within a vehicle, according to one example.

Referring to FIGS. 1 and 2, the vehicle 46 includes at least one floor track assembly 18 disposed on a vehicle floor 66. The seating assemblies 10 are positioned along the floor track assembly 18. As illustrated in FIG. 1, the vehicle 46 includes two floor track assemblies 18 that extend between the first seating row 54 and the third seating row 62. Accordingly, the seating assemblies 10 are translatable between fore and aft positions along the floor track assemblies 18, respectively. The seating assemblies 10 may be independently translatable, such that a single seating assembly 10 is moved between each of the first, second, and third seating rows 54, 58, 62. Additional seating assemblies 10 may be stored within the vehicle 46 and/or removable from the vehicle 46 to allow for movement of other seating assemblies 10 between the fore and aft positions.

As illustrated in FIG. 2, in various examples, there may not be seating assemblies 10 disposed in at least one of the first, second, and/or third seating rows 54, 58, 62. The floor track assemblies 18 may provide various seating configurations within the vehicle 46 for a variety of user purposes. For example, the vehicle 46 may include seating assemblies 10 in each of the first, second, and third seating rows 54, 58, 62, as illustrated in FIG. 1. Alternatively, as illustrated in FIG. 2, two seating assemblies 10 may be positioned in a single seating row with other seating assemblies 10 removed or stored elsewhere, providing for additional storage space within the vehicle 46.

Figure 3:
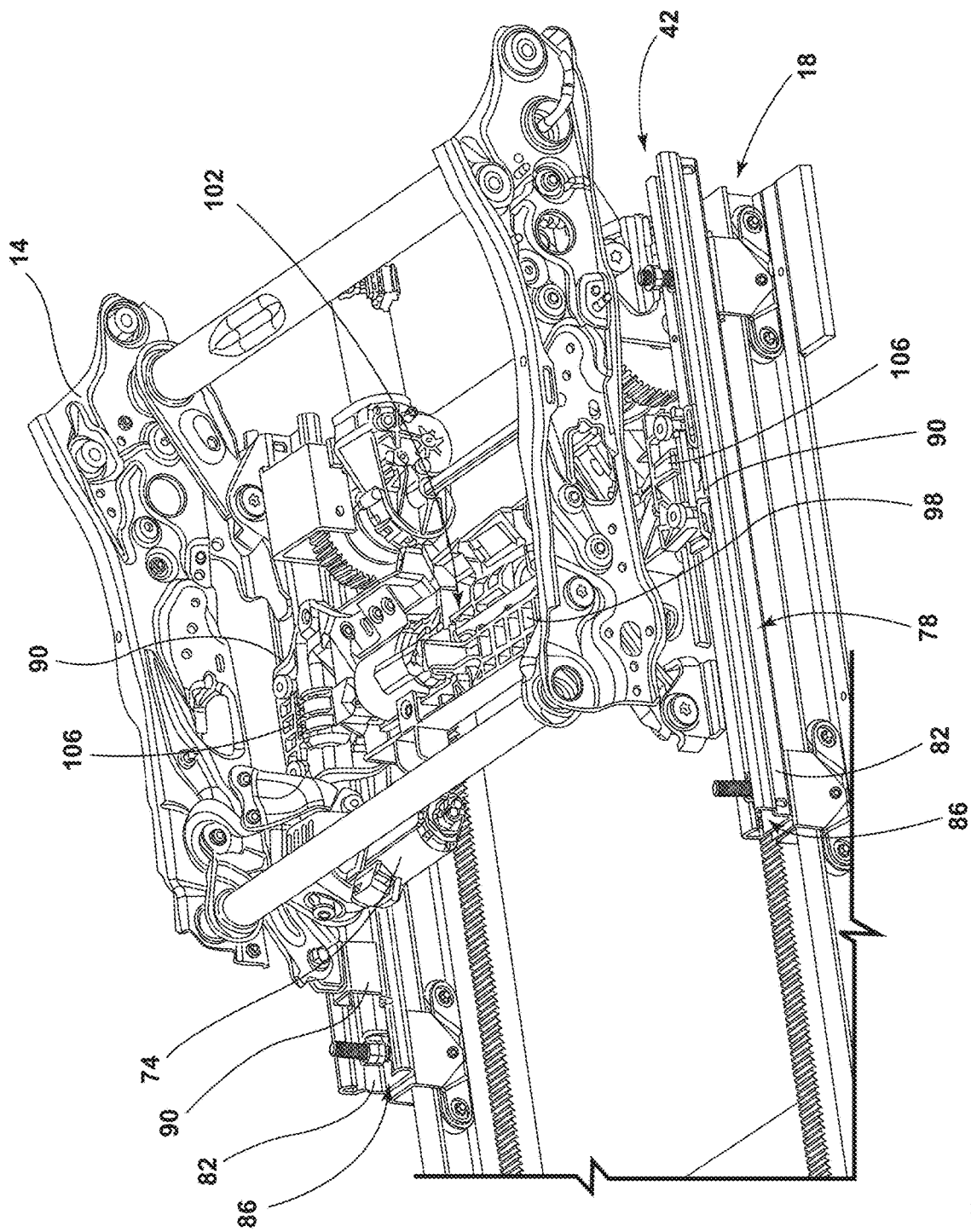
FIG. 3 is a partial side perspective view of an elevated track assembly and a floor track assembly for a seating assembly, according to one example.

Referring to FIGS. 2 and 3, a seat back 70 of the seating assembly 10 is operably coupled to the seat base 14. The seating assembly 10 may include a positioning motor 74 for adjusting the seat back 70 relative to the seat base 14. The positioning motor 74 may be disposed adjacent to at least one of the elevated track assembly 42 and the floor track assembly 18.

Referring to FIG. 3, the seat base 14 of each seating assembly 10 is coupled to the elevated track assembly 42, respectively. The elevated track assembly 42 is operably coupled to the floor track assembly 18. The elevated track assembly 42 laterally translates the seat base 14 relative to the floor track assembly 18. In other words, the elevated track assembly 42 includes a elevated track 78 for translating the seat base 14 fore and aft along the elevated track 78 relative to the floor track assembly 18. As illustrated in FIG. 3, the elevated track assembly 42 is disposed on the floor track assembly 18. However, it is contemplated that the elevated track assembly 42 may be disposed adjacent to or otherwise operably coupled to the floor track assembly 18. In various examples, the elevated track assembly 42 is laterally translatable relative to the floor track assembly 18. In other words, the elevated track assembly 42 moves fore and aft along the floor track assembly 18. Additionally or alternatively, the elevated track assembly 42 is translated between fore and aft positions within the vehicle 46 providing for a variety of seating configurations. Accordingly, as the elevated track assembly 42 is laterally translatable relative to the floor track assembly 18, the seat base 14 coupled to the elevated track assembly 42 may also be laterally translated relative to the floor track assembly 18. Accordingly, the elevated track 78 of the elevated track assembly 42 may be operably coupled to the floor track 22 of the floor track assembly 18. The floor track 22 may have a length in a range of about 4 feet to about 8 feet. The elevated track 78 may have a length less than the length of the floor track 22, such that the elevated track 78 may be laterally translated along the floor track 22.

Figure 4:
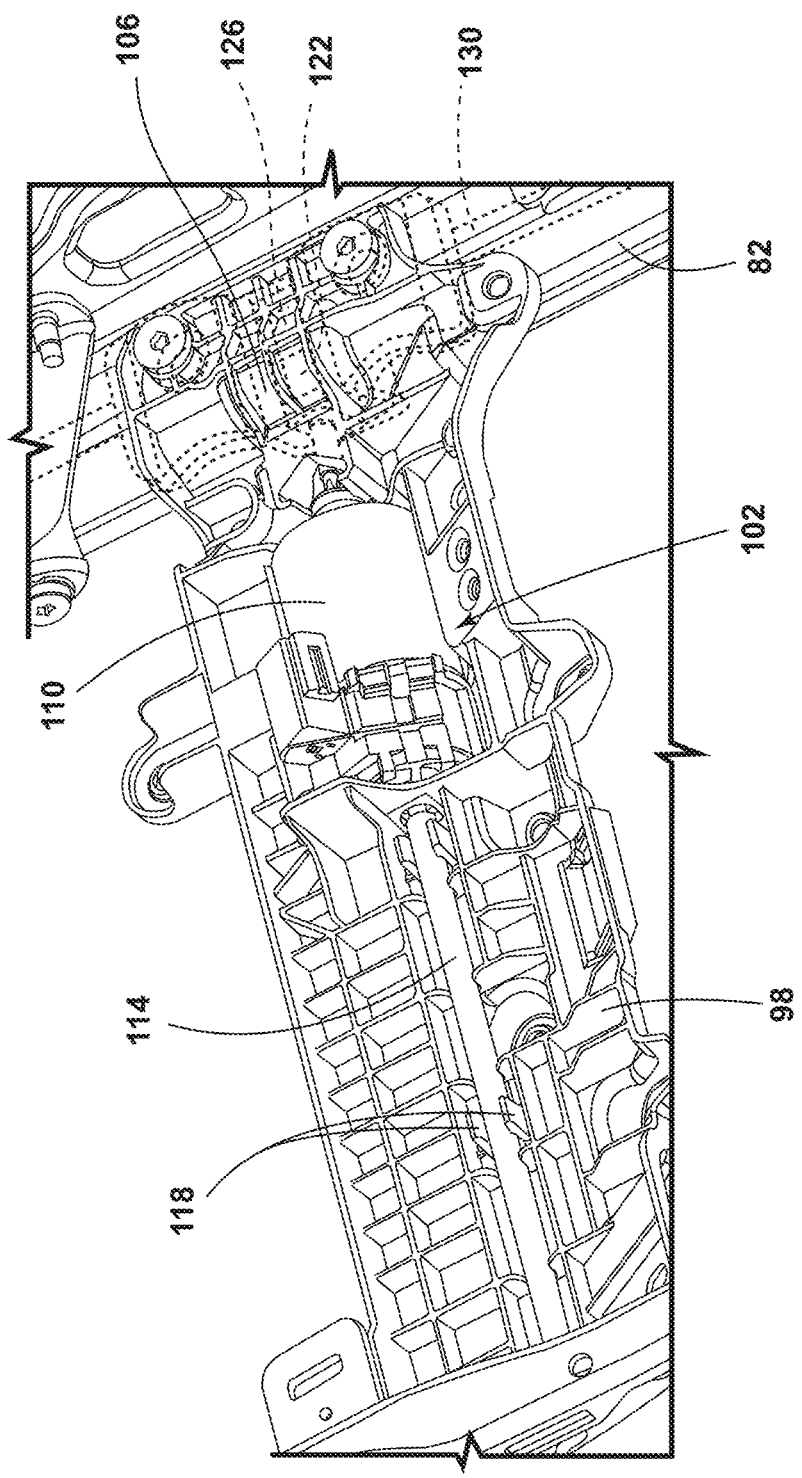
FIG. 4 is an enlarged partial top perspective view of an elevated track assembly, according to one example.

Referring to FIGS. 3 and 4, the elevated track assembly 42 includes the elevated track 78 including rails 82 for laterally translating the seat base 14. As illustrated, the elevated track 78 includes two rails 82 spaced-apart from and parallel to one another. The rails 82 each define a channel 86, and rail slides 90 are positioned within the channels 86 of the rails 82. A single rail slide 90 may be disposed within each channel 86, or more than one rail slide 90 may be disposed within each channel 86. The rail slides 90 may be slidably coupled with the rails 82. Additionally or alternatively, the rail slides 90 may be releasably secured to the elevated track assembly 42. In various examples, the rails 82 are operably coupled to one another via a cross support 98 extending therebetween. The cross support 98 may be coupled to the rail slides 90 assembled with the rails 82. Additionally, the seat base 14 may be coupled to the rail slides 90 of the rails 82. Additionally or alternatively still, the rail slides 90 may be slidably coupled to the elevated track assembly 42 to allow fore and aft movement of the seating assembly 10 relative to the floor track assembly 18. Accordingly, the cross support 98 and the seat base 14 may move as a single unit along the elevated track assembly 42.

In various examples, an elevated track motor assembly 102 is disposed adjacent to the elevated track assembly 42. As illustrated in FIG. 4, the cross support 98 supports the elevated track motor assembly 102. The elevated track motor assembly 102 includes gearboxes 106 operably coupled to each of the rails 82, an elevated track motor 110, and a flex cable 114. The cross support 98 may include clip features 118 for retaining the flex cable 114 on the cross support 98. The flex cable 114 extends across the cross support 98 and engages both of the gearboxes 106. Additionally or alternatively, the flex cable 114 may extend through the elevated track motor 110. However, the flex cable 114 may be otherwise operably coupled with the elevated track motor 110 without departing from the teachings herein. The gearboxes 106 include a first gear 122 operably coupled with a second gear 126. The first gear 122 may be engaged with the flex cable 114 and the second gear 126 may be engaged with a threaded rail 130 disposed within the elevated track 78. In other words, each of the rails 82 includes a threaded rail 130 disposed therein. In various examples, the elevated track motor 110 operates at a range of from about 400 RPM to about 800 RPM. The elevated track motor 110 and the flex cable 114 may operate to rotate the first gears 122. The first gears 122 engage and rotate the second gear 126, and the second gears 126 engage and rotate the threaded rails 130 in response to the operation of the elevated track motor 110. The engagement of the threaded rails 130 by the second gears 126 may laterally translate the rail slides 90 relative to the floor track assembly 18. As previously explained, the seat base 14 and the cross support 98 may be coupled to the rail slides 90. Accordingly, the elevated track motor 110 may operate to laterally translate the rail slides 90, as well as the cross support 98 and the seat base 14 coupled thereto.

Figure 5:
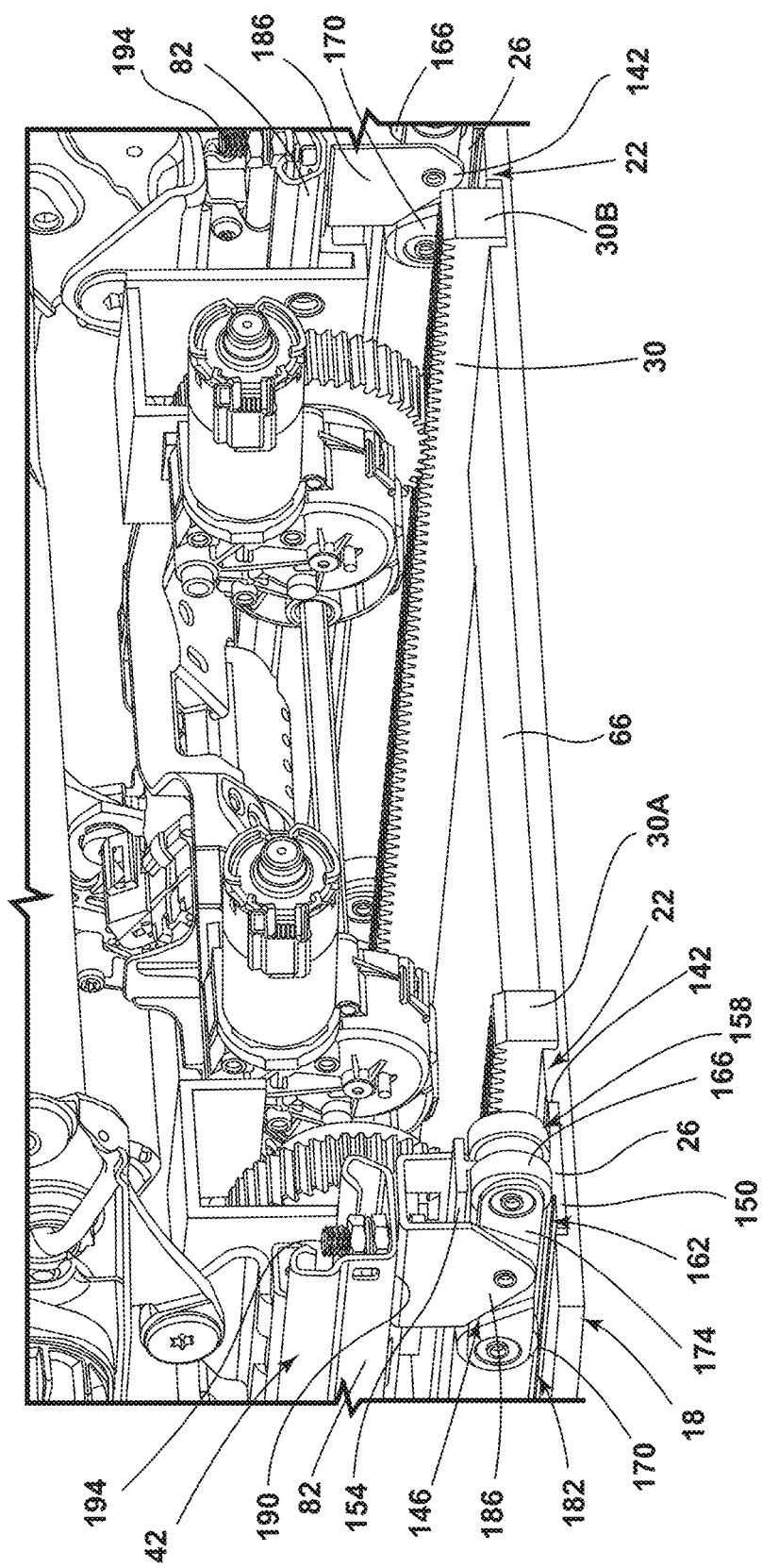
FIG. 5 is an enlarged partial front perspective view of a floor track assembly and an elevated track assembly, according to one example.

Referring to FIG. 5, the floor track assembly 18 is disposed on the vehicle floor 66 below the elevated track assembly 42. The floor track assembly 18 includes the floor track 22 having the roller track 26 and the rack 30. The roller track 26 is disposed adjacent to the rack 30. In various examples, the floor track 22 includes two roller tracks 26 spaced-apart and disposed parallel to one another. In such examples, the floor track 22 may include two racks 30 spaced-apart and disposed parallel to each other. Stated differently, the floor track 22 may include a first rack 30A and a second rack 30B. Additionally or alternatively, the roller tracks 26 and the racks 30 may be disposed parallel to each other. The racks 30 may be disposed adjacent to an interior side 142 of each of the roller tracks 26. In other words, the roller tracks 26 may be the outermost tracks of the floor track 22, and the racks 30 may be the innermost tracks of the floor track 22. However, other configurations of the roller tracks 26 and racks 30 are also contemplated without departing from the teachings herein. Each of the roller tracks 26 and the racks 30 may extend the same length. In various examples, the roller tracks 26 and racks 30 of the floor track assembly 18 may have a length in a range of from about 4 feet to about 8 feet.

Figure 6:
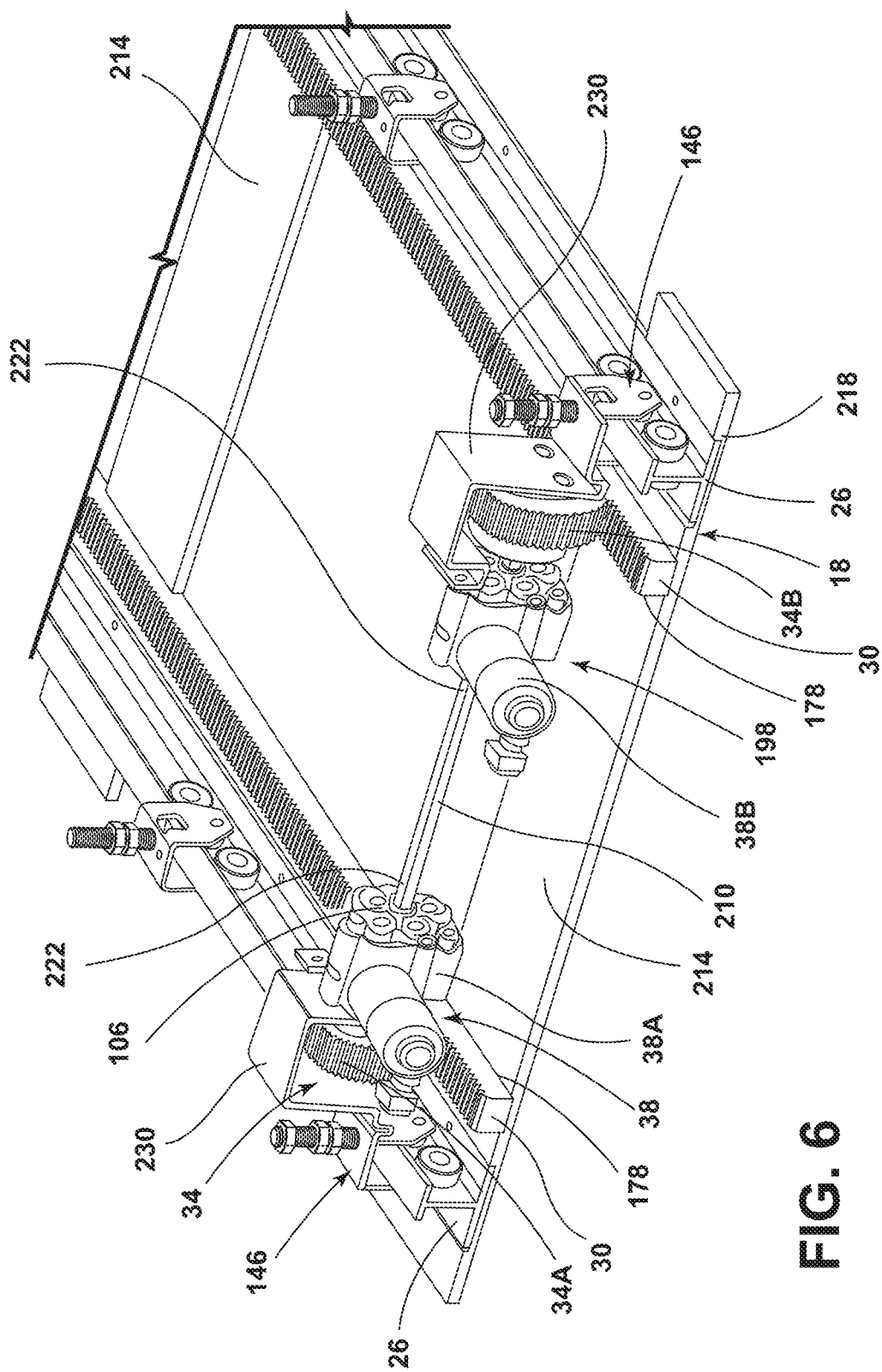
FIG. 6 is a partial front perspective view of a floor track assembly with an elevated track assembly removed, according to one example.

Referring to FIGS. 5 and 6, in various examples, the floor track assembly 18 includes roller assemblies 146 for engaging the roller tracks 26. The floor track assembly 18 may include more than one roller assembly 146 engaging each roller track 26. The roller tracks 26 may be substantially I-shaped to provide a lower surface 150 for the roller assemblies 146 to translate along, as well as an upper surface 154 for retaining the roller assemblies 146 within the roller track 26. The roller assemblies 146 may each include an inner wheel assembly 158 and an outer wheel assembly 162. Each of the inner and outer wheel assemblies 158, 162 may include a first wheel 166 coupled to a second wheel 170 via a connector 174. The inner wheel assembly 158 is disposed on the interior side 142 of the roller track 26 and the outer wheel assembly 162 is disposed on an outer side 182 of the roller track 26. In such examples, the I-shaped roller track 26 is disposed between the inner and outer wheel assemblies 158, 162. The inner and outer wheel assemblies 158, 162 of each of the roller assemblies 146, respectively, are coupled to one another via roller assembly brackets 186. The roller assembly brackets 186 may be substantially U-shaped. In such examples, the roller assembly brackets 186 is coupled to the connectors 174 of the inner and outer wheel assemblies 158, 162. The roller assembly brackets 186 of the roller assemblies 146 may be coupled to the rails 82 of the elevated track assembly 42. In various examples, the roller assembly brackets 186 are aligned with and coupled to bottom surfaces 190 of the rails 82. The roller assembly brackets 186 may be fastened, adhered, welded, or otherwise coupled with the rails 82. As illustrated, the roller assembly brackets 186 are coupled to the rails 82 via fasteners 194, which may be, for example, screws, bolts, or pins.

Referring again to FIG. 6, a floor track motor assembly 198 is disposed adjacent to the floor track assembly 18. The floor track motor assembly 198, as illustrated in FIG. 6, includes a first floor track motor 38A and a second floor track motor 38B. The first and second floor track motors 38A, 38B are operably coupled together. However, it is contemplated that the floor track motor assembly 198 may include a single floor track motor 38 or more than one floor track motors 38 depending on the configuration of the floor track assembly 18. The floor track motor assembly 198 includes a cross member 210 for coupling the first and second floor track motors 38A, 38B. Additionally, the floor track motor assembly 198 includes first and second pinion gears 34A, 34B operably coupled to the first and second floor track motors 38A, 38B, respectively. The floor track assembly 18 may include fewer or more pinion gears 34 without departing from the teachings herein. In various examples, the floor track assembly 18 may include at least as many pinion gears 34 as floor track motors 38 in the floor track motor assembly 198. The first floor track motor 38A may be disposed adjacent to one of the roller tracks 26 and one of the racks 30 of the floor track assembly 18. Additionally or alternatively, the second floor track motor 38B is disposed adjacent to the other roller track 26 and the other rack 30. The first and second floor track motors 38A, 38B may be disposed proximate an inner side 178 of the corresponding rack 30.

Referring still to FIG. 6, the first and second pinion gears 34A, 34B are disposed on the racks 30, and are configured to laterally translate along the racks 30. The first and second floor track motors 38A, 38B rotate the first and second pinion gears 34A, 34B along the racks 30. The first and second floor track motors 38A, 38B may be electric motors having variable speed settings. The first and second floor track motors 38A, 38B may be powered simultaneously and, accordingly, may rotate the first and second pinion gears 34A, 34B simultaneously. The first and second floor track motors 38A, 38B may be operably coupled together for increased speed and torque. In various examples, the first and second floor track motors 38A, 38B may translate the floor track motor assembly 198 along the racks 30 via the rotation of the first and second pinion gears 34A, 34B. The floor track motor assembly 198 may be coupled to the roller assemblies 146 and operate to translate the roller assemblies 146 in conjunction with the rotation of the first and second pinion gears 34A, 34B. Additionally or alternatively, the elevated track assembly 42 may be coupled to the roller assemblies 146. Accordingly, the elevated track assembly 42, and the seat base 14 coupled to the elevated track assembly 42, may be translated in conjunction with the rotation of the first and second pinion gears 34A, 34B. The seat base 14 may translate along the rack 30 at a rate in a range of from about 0.5 inches per second to about 3 inches per second. However, the first and second floor track motors 38A, 38B may translate the seat base 14 at other rates without departing from the teachings herein.

In various examples, the floor track assembly 18 includes supports 214. The roller tracks 26 and the racks 30 may be disposed on the supports 214. Additionally or alternatively, the supports 214 may define multiple cutouts 218, and the roller tracks 26 and/or the racks 30 may be disposed in the cutouts 218. The roller tracks 26 and the racks 30 may be fixedly coupled or adhered to the supports 214, such that the roller tracks 26 and the racks 30 may be stationary relative to the vehicle floor 66. The supports 214 may be coupled to the vehicle floor 66 or, alternatively, may be integrally formed with the vehicle floor 66.

Figure 7:
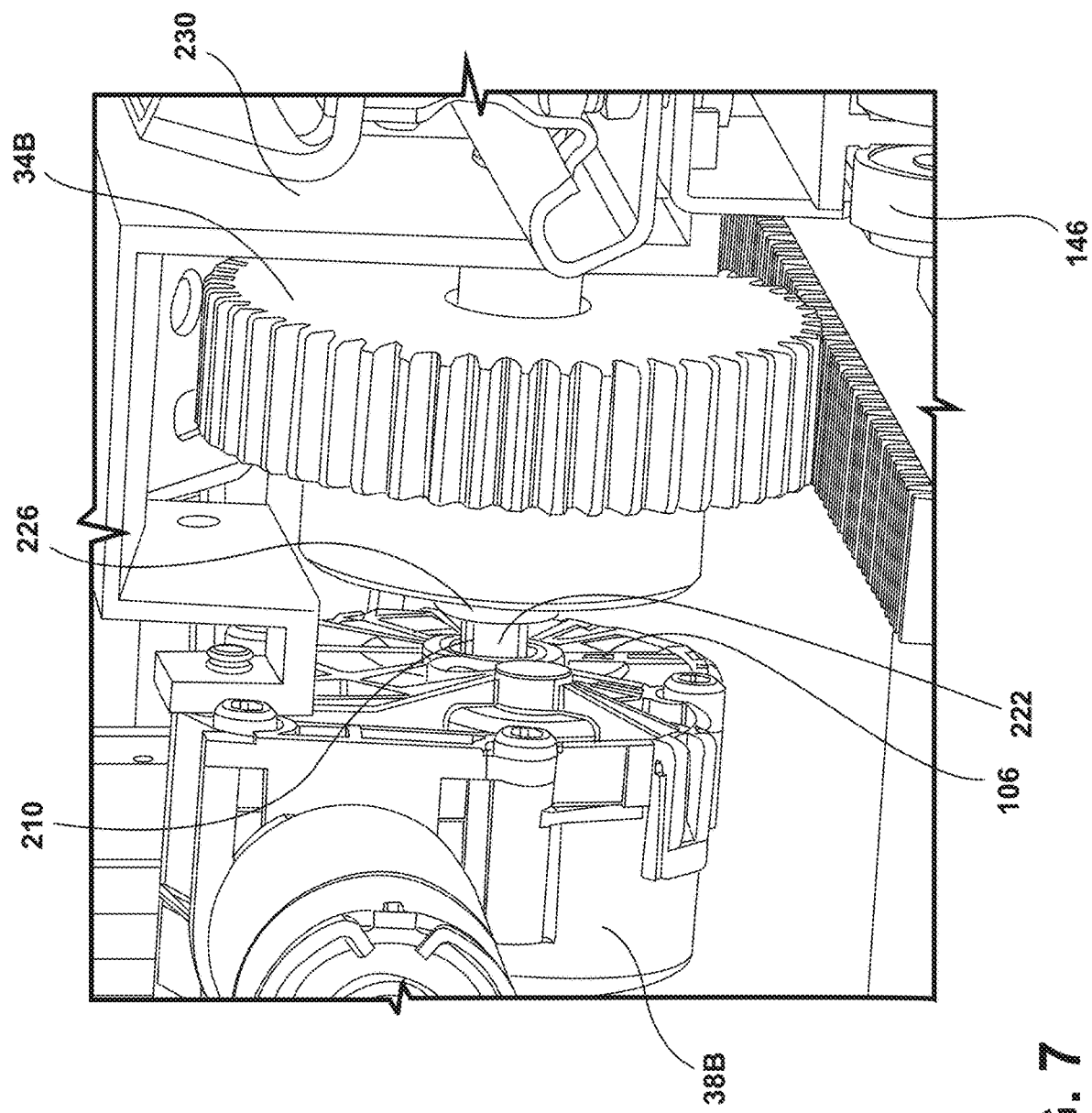
FIG. 7 is an enlarged partial front perspective view of a pinion gear engaging a rack of a floor track assembly, according to one example.

Referring to FIGS. 6 and 7, each of the first and second floor track motors 38A, 38B includes the gearboxes 106. The cross member 210 may extend through the gearboxes 106 of the first and second floor track motors 38A, 38B. Opposing ends 222 of the cross member 210 each engage a coupling member 226. The coupling members 226 engage and extend through the first and second pinion gears 34A, 34B. Accordingly, the first and second floor track motors 38A, 38B couple with the cross member 210 and/or the coupling members 226 to engage and rotate the first and second pinion gears 34A, 34B, respectively.

Referring still to FIGS. 6 and 7, in various examples, the floor track assembly 18 includes motor brackets 230 for coupling the first and second floor track motors 38A, 38B to the roller assemblies 146 of the roller track 26. The first and second floor track motors 38A, 38B may be mechanically fastened to the motor brackets 230. One motor bracket 230 extends vertically upward from an outer side 182 of the first floor track motor 38A and extends over the first pinion gear 34A. The motor bracket 230 then extends vertically downward to contact the roller assembly 146 on the roller track 26 disposed adjacent to the first floor track motor 38A. Another motor bracket 230 is coupled to the second floor track motor 38B and disposed relative to the second pinion gear 34B in a similar manner. Accordingly, the first and second pinion gears 34A, 34B are disposed under and/or in the motor brackets 230. The motor brackets 230 may be spaced-apart from the first and second pinion gears 34A, 34B to allow for the rotation of the first and second pinion gears 34A, 34B.

Figure 8:
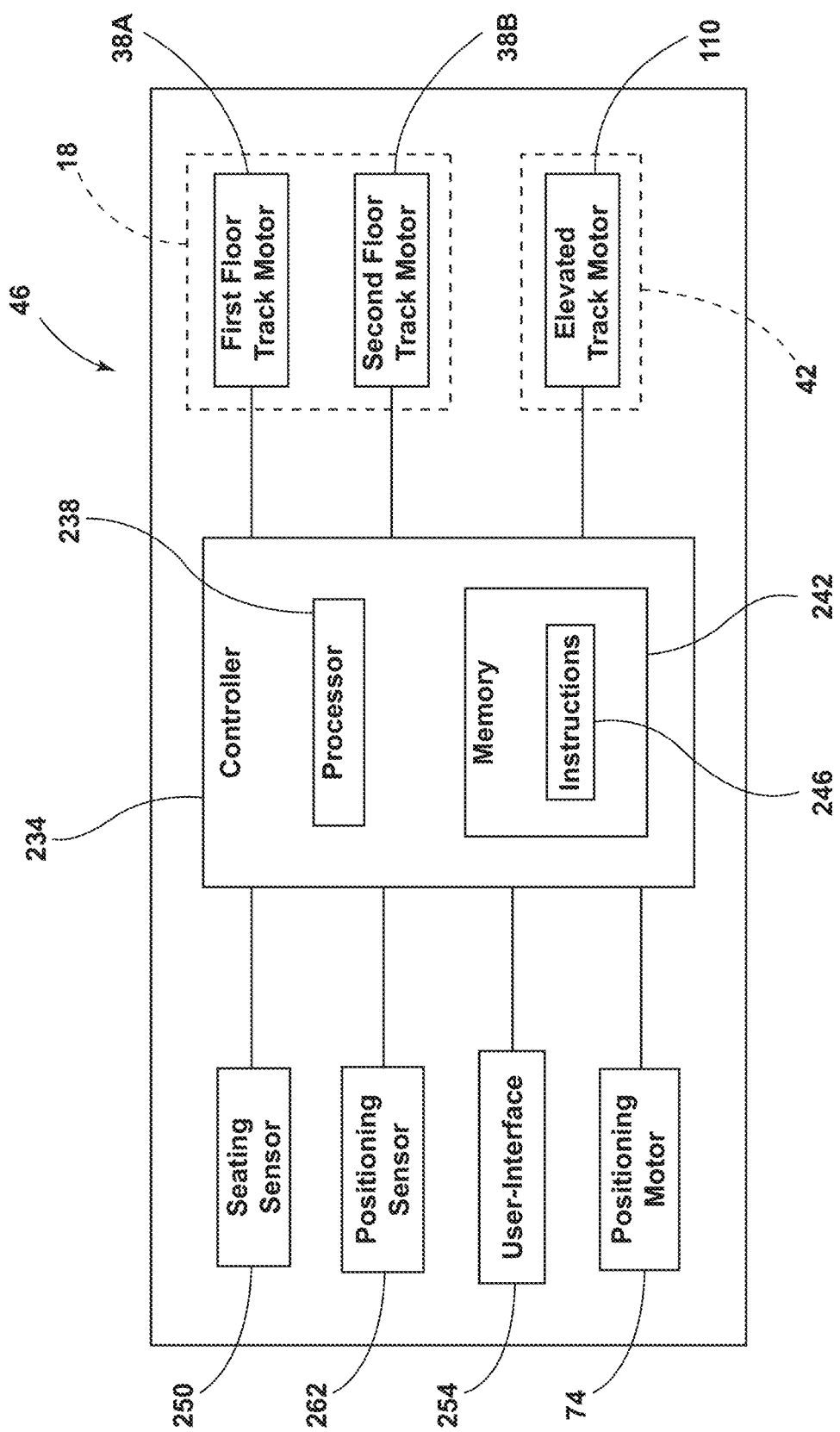
FIG. 8 is a block diagram of a vehicle, according to one example.

Referring to FIG. 8, the vehicle 46 includes a controller 234 operably coupled to the elevated track motor 110 and the first and second floor track motors 38A, 38B. The controller 234 may also be operably coupled to the positioning motor 74. The controller 234 includes a processor 238, a memory 242, and other control circuitry. Stored in the memory 242 and executable by the processor 238 are instructions 246 relating to various functions. The instructions 246 include at least one instruction 246 for operating the first and second floor track motors 38A, 38B. For example, the instructions 246 may include operation speeds for the first and second floor track motors 38A, 38B. The operation speeds may be adjustable via pulse width modulation (PWM) controls. Such PWM controls may be advantageous for adjusting the speed of operation of the first and second floor track motors 38A, 38B when the corresponding seating assembly 10 is occupied by a passenger. Additionally or alternatively, the PWM controls may provide for the first and second floor track motors 38A, 38B to run at a lower duty cycle for slower stops when the seating assembly 10 reaches a selected position. In various examples, the seating assemblies 10 may each include a seating sensor 250 for sensing whether the seating assembly 10 is occupied. The seating sensor 250 may be operably coupled to the controller 234. The seating sensor 250 may be any type of sensor, such as, for example, a capacitive, force, or proximity sensor. The controller 234 may be a primary controller 234 for the vehicle 46 (e.g., a vehicle control module, a body control module, etc.) or may be a separate controller 234 for the floor and/or elevated track assemblies 18, 42.

The controller 234 may also be operably coupled with a user-interface 254. The user-interface 254 may allow a user to select seating configurations or positions of the seating assembly 10 along the elevated track assembly 42 and/or the floor track assembly 18. In various examples, the memory 242 of the controller 234 includes the instructions 246 that relate to predefined seating positions. The predefined seating positions may be positions relative to the elevated track assembly 42, the floor track assembly 18, or a combination thereof. The floor track assembly 18 may include at least one positioning sensor 262 disposed on the floor track assembly 18. The positioning sensors 262 may sense the location of the seating assembly 10 relative to the floor track assembly 18 to provide for proper alignment of the seating assembly 10 based on the user-selected seating configuration or position. The positioning sensors 262 may be any type of sensors, such as, for example, capacitive, force, or proximity sensors.

Referring again to FIGS. 1-8, in operation, the floor track assembly 18 operates to move a corresponding seating assembly 10 between fore and aft positions within the vehicle 46. Accordingly, the first and second floor track motors 38A, 38B translate the seat base 14 fore and aft. The floor track motor assembly 198, having the first and second floor track motors 38A, 38B, rotate the first and second pinion gears 34A, 34B along the racks 30. The first and second floor track motors 38A, 38B may be coupled to both the first and second pinion gears 34A, 34B, respectively, and the roller assemblies 146 of the roller tracks 26. As such, when the first and second floor track motors 38A, 38B rotate the first and second pinion gears 34A, 34B along the racks 30, the floor track motor assembly 198 laterally translates with the first and second pinion gears 34A, 34B. The elevated track assembly 42 may be coupled to the roller assemblies 146 of the roller track 26. When the roller assemblies 146 laterally translate along the roller tracks 26 in response to the first and second floor track motors 38A, 38B rotating the first and second pinion gears 34A, 34B, the elevated track assembly 42 may also be laterally translated along the roller track 26 as a result of the elevated track assembly 42 being coupled to the roller tracks 26. In other words, the elevated track assembly 42 is laterally translatable relative to the floor track assembly 18. The elevated track assembly 42 may laterally translate the seat base 14 fore and aft relative to the floor track assembly 18. Accordingly, the floor track assembly 18 may translate the seat base 14 between fore and aft positions within the vehicle 46, and the elevated track assembly 42 translates the seat base 14 fore and aft. The floor track assembly 18 may translate the seat base 14 a greater distance than the elevated track assembly 42. The floor track assembly 18 may provide for movement of the seating assemblies 10 between the first, second, and third seating rows 54, 58, 62. The elevated track assembly 42 may provide for fore and aft movement when the seating assemblies 10 are positioned within the first, second, or third seating rows 54, 58, 62. However, it is also contemplated that the seating assemblies 10 translate fore and aft at any position along the floor track 22 of the floor track assembly 18 within the vehicle 46, and may not be aligned with the first, second, or third seating row 54, 58, 62.

Use of the present disclosure may provide for a variety of advantages. For example, the floor track assembly 18 may allow the seating assemblies 10 to laterally translate between fore and aft positions in the vehicle 46. Further, the floor track assembly 18 may allow seating assemblies 10 to laterally translate between seating rows of the vehicle 46. Moreover, the first and second floor track motors 38A, 38B may provide for increased speed in laterally translating the seating assemblies 10 within the vehicle 46. The elevated track assembly 42 may laterally translate the seating assemblies 10 relative to the floor track assembly 18. The elevated track assembly 42 and the floor track assembly 18 may provide for two different types of seating adjustments within the vehicle 46. Additionally, the elevated track assembly 42 and the floor track assembly 18 may provide for a variety of seating configurations and positions within the vehicle 46. Accordingly, the vehicle 46 may be used for a variety of purposes with adjustable seating spaces and storage spaces within the vehicle 46.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
   a seat base;
   a floor track assembly including a floor track having a roller track and a rack;
   at least one pinion gear configured to rotate along the rack;
   at least one floor track motor disposed adjacent to the floor track assembly, wherein the at least one floor track motor rotates the at least one pinion gear along the rack to laterally translate the seat base fore and aft; and
   an elevated track assembly operably coupled to the floor track assembly, wherein the seat base is coupled to the elevated track assembly, and wherein the elevated track assembly is laterally translatable relative to the floor track assembly.

2. The vehicle seating assembly of claim 1, wherein the at least one floor track motor includes a first floor track motor and a second floor track motor, and wherein the first and second floor track motors are coupled by a cross member.

3. The vehicle seating assembly of claim 2, wherein the at least one pinion gear includes a first pinion gear and a second pinion gear, and wherein the cross member extends through the first and second floor track motors to couple with the first and second pinion gears.

4. The vehicle seating assembly of claim 1, wherein the elevated track assembly includes an elevated track for laterally translating the seat base relative to the floor track assembly.

5. The vehicle seating assembly of claim 1, further comprising:
an elevated track motor disposed adjacent to the elevated track assembly.

6. The vehicle seating assembly of claim 1, wherein the floor track assembly includes a roller assembly operably coupled to the roller track, and wherein the elevated track assembly is coupled to the roller assembly for translating the elevated track assembly relative to the floor track assembly.

7. The vehicle seating assembly of claim 1, wherein the seat base is translated along the rack at a rate in a range of from about 0.5 inches per second to about 3 inches per second.

8. A seating assembly, comprising:
a floor track assembly including a floor track for laterally translating a seat base between fore and aft positions;
a first floor track motor disposed adjacent to the floor track assembly;
a second floor track motor disposed adjacent to the floor track assembly and operably coupled to the first floor track motor, wherein the first and second floor track motors laterally translate the seat base along the floor track assembly; and
an elevated track assembly including an elevated track for laterally translating the seat base relative to the floor track assembly, wherein the elevated track assembly is operably coupled to the floor track assembly.

9. The seating assembly of claim 8, wherein the floor track includes a roller track and a rack.

10. The seating assembly of claim 9, wherein the floor track assembly includes a roller assembly engaging the roller track, and wherein the elevated track is coupled to the roller assembly.

11. The seating assembly of claim 8, further comprising:
first and second pinion gears operably coupled to the first and second floor track motors.

12. The seating assembly of claim 11, wherein the floor track assembly includes a first rack and a second rack, and further wherein the first and second floor track motors rotate the first and second pinion gears along the first and second racks, respectively, to translate the seat base between the fore and aft positions.

13. The seating assembly of claim 8, wherein the elevated track assembly is laterally translatable relative to the floor track assembly.

14. The seating assembly of claim 8, further comprising:
an elevated track motor assembly including an elevated track motor for translating the seat base fore and aft relative to the floor track assembly.

15. The seating assembly of claim 8, wherein operation speeds of the first and second floor track motors are adjustable via pulse width modulation controls.

16. A seat adjustment assembly, comprising:
a floor track assembly including a floor track having a rack;
a floor track motor assembly including at least one floor track motor and a pinion gear, wherein the at least one floor track motor rotates the pinion gear along the rack;
an elevated track assembly operably coupled to the floor track assembly; and
an elevated track motor assembly including an elevated track motor for laterally translating a seat base fore and aft relative to the floor track assembly.

17. The seat adjustment assembly of claim 16, wherein the floor track includes a roller track disposed adjacent to the rack.

18. The seat adjustment assembly of claim 16, wherein the elevated track assembly includes an elevated track for laterally translating a seat base relative to the floor track assembly.

19. The seat adjustment assembly of claim 16, wherein the floor track assembly includes a cross member, and further wherein the at least one floor track motor includes a first floor track motor and a second floor track motor coupled via the cross member.

20. The seat adjustment assembly of claim 16, wherein the elevated track assembly is laterally translatable relative to the floor track assembly.

* * * * *